(12) United States Patent
Rao Kota et al.

(10) Patent No.: US 12,127,035 B2
(45) Date of Patent: *Oct. 22, 2024

(54) TRAFFIC ENGINEERING IN 5G AND LTE CUPS ARCHITECTURE

(71) Applicant: Cisco Technology, Inc., San Jose, CA (US)

(72) Inventors: Raghavendar Rao Kota, Colorado Springs, CO (US); Nithin Chitta, Bangalore (IN); Srinivasa R. Irigi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/491,396

(22) Filed: Oct. 20, 2023

(65) Prior Publication Data

US 2024/0049048 A1 Feb. 8, 2024

Related U.S. Application Data

(63) Continuation of application No. 17/370,831, filed on Jul. 8, 2021, now Pat. No. 11,812,300.

(51) Int. Cl.
*H04W 28/02* (2009.01)
*H04W 28/10* (2009.01)
*H04W 60/00* (2009.01)

(52) U.S. Cl.
CPC ....... *H04W 28/0289* (2013.01); *H04W 28/10* (2013.01); *H04W 60/00* (2013.01)

(58) Field of Classification Search
CPC .......... H04L 41/5009; H04L 43/0876; H04W 24/02; H04W 28/0289; H04W 28/10; H04W 60/00; H04W 88/08
See application file for complete search history.

(56) References Cited

U.S. PATENT DOCUMENTS

| | | |
|---|---|---|
| 11,602,003 B1 * | 3/2023 | Bertz .................. H04W 12/033 |
| 2017/0288961 A1 | 10/2017 | Li et al. |
| 2017/0295519 A1 * | 10/2017 | Xu .......................... H04W 4/06 |
| 2018/0098245 A1 * | 4/2018 | Livanos ................. H04L 47/11 |
| 2020/0053685 A1 | 2/2020 | Chandramouli et al. |

FOREIGN PATENT DOCUMENTS

| | | |
|---|---|---|
| WO | 2020014337 | 1/2020 |
| WO | 2020215104 A2 | 10/2020 |
| WO | 20201292630 | 10/2020 |
| WO | 2021083534 | 5/2021 |

OTHER PUBLICATIONS

International Search Report and Written Opinion for International Application No. PCT/US2022/036370, mailed Sep. 27, 2022, 11 Pages.

* cited by examiner

*Primary Examiner* — Khoa Huynh
(74) *Attorney, Agent, or Firm* — Polsinelli P.C.

(57) ABSTRACT

Technologies for systems, methods and computer-readable storage media for solving complex distributed congestion in a 5G network by using traffic engineering data to redirect sessions. Specifically, involving anchoring a network node to a User Plane (UP) entity based on traffic engineering data and subscribing to traffic engineering data associated with requested parameters to push particular policies and/or select alternate application functions to correct congestion.

20 Claims, 11 Drawing Sheets

TRAFFIC ENGINEERING IN 5G AND LTE CUPS ARCHITECTURE

CROSS-REFERENCE TO RELATED APPLICATION

The instant application is a continuation of U.S. Non-Provisional patent application Ser. No. 17/370,831, filed on Jul. 8, 2021, entitled "TRAFFIC ENGINEERING IN 5G AND LTE CUPS ARCHITECTURE", the full disclosure of which is hereby expressly incorporated by reference in its entirety.

TECHNICAL FIELD

The present disclosure relates to the field of 5G networking and more specifically to improving traffic engineering in 5G Stand-Along (SA) and LTE Control Plane and User Plane Separation (CUPS) architecture.

DESCRIPTION OF THE RELATED TECHNOLOGY

Fifth-generation (5G) mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits the controlled composition of a PLMN with the specific network functions and provided services that are required for a specific usage scenario. In other words, network slicing enables a 5G network operator to deploy multiple, independent PLMNs where each is customized by instantiating only those features, capabilities, and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with an Access and Mobility Management Function (AMF)/Mobility Management Entity (MME) for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

BRIEF DESCRIPTION OF THE DRAWINGS

In order to describe the manner in which the above-recited and other advantages and features of the disclosure can be obtained, a more particular description of the principles briefly described above will be rendered by reference to specific aspects thereof which are illustrated in the appended drawings. Understanding that these drawings depict only exemplary aspects of the disclosure and are not therefore to be considered to be limiting of its scope, the principles herein are described and explained with additional specificity and detail through the use of the accompanying drawings in which.

DETAILED DESCRIPTION

Figure 1A:
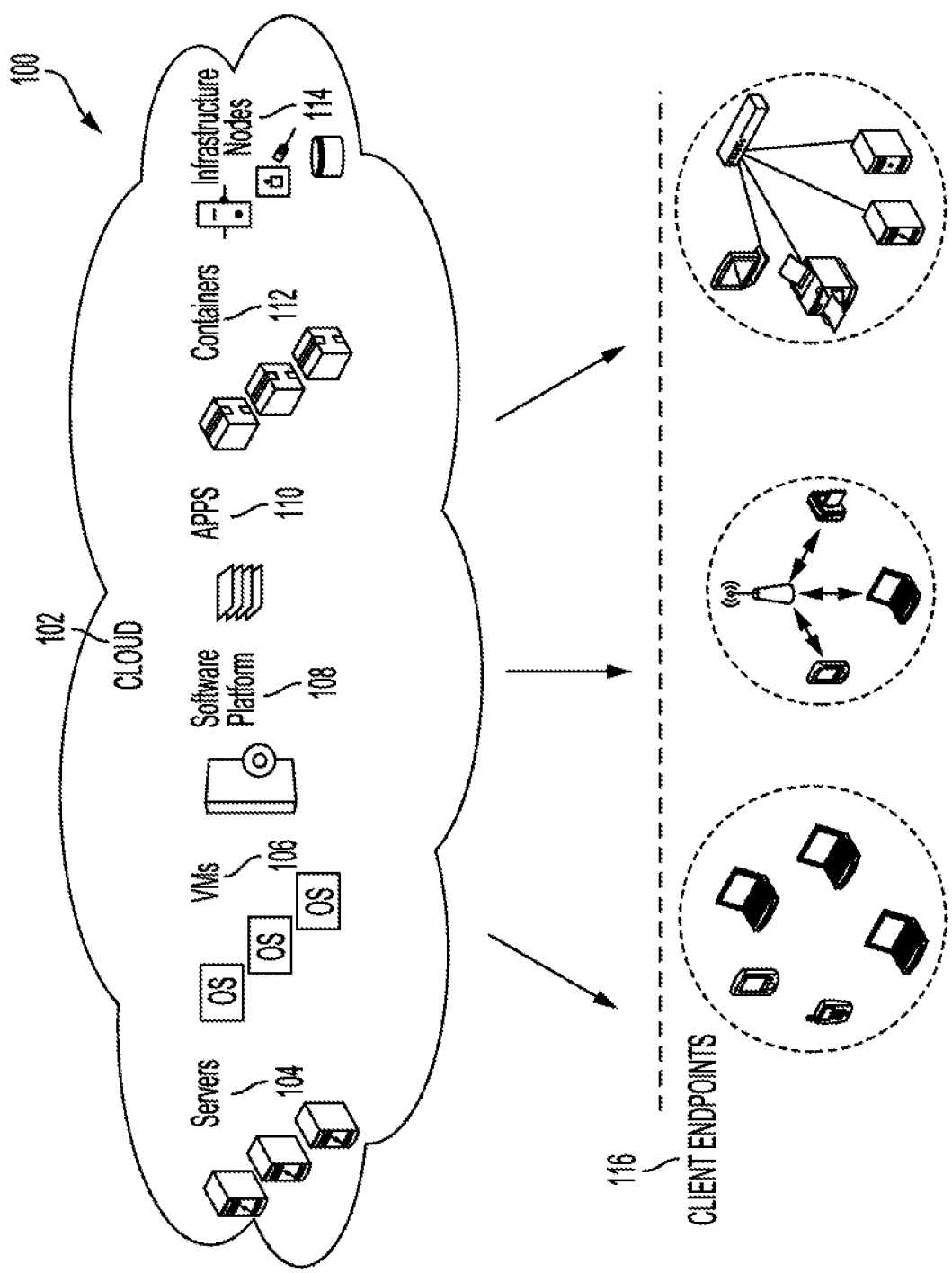
FIG. 1A illustrates an example cloud computing architecture.

Various aspects of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an aspect in the present disclosure can be references to the same aspect or any aspect; and, such references mean at least one of the aspects.

Reference to "one aspect" or "an aspect" means that a particular feature, structure, or characteristic described in connection with the aspect is included in at least one aspect of the disclosure. The appearances of the phrase "in one aspect" in various places in the specification are not necessarily all referring to the same aspect, nor are separate or alternative aspects mutually exclusive of other aspects. Moreover, various features are described which may be exhibited by some aspects and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various aspects given in this specification.

Without intent to limit the scope of the disclosure, examples of instruments, apparatus, methods and their related results according to the aspects of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include receiving an attach request message from a subscribing gNodeB network node. Further, the method can include receiving traffic engineering data associated with one or more User Plane (UP) entities for selecting a least congested network path. The subscribing gNodeB network node can be anchoring to a first UP entity of the one or more UP entities based on the traffic engineering data. Specifically, the traffic engineering data comprises a list of UPs along an optimal path with congestion below a determined threshold, and wherein the anchoring the first UP entity is based on the list of UPs.

A system can include one or more processors and at least one computer-readable storage medium storing instructions which, when executed by the one or more processors, cause the one or more processors to receive an attach request message from a subscribing gNodeB network node. The instructions can cause the one or more processors to receive traffic engineering data associated with one or more User Plane (UP) entities for selecting a least congested network path. The instructions can also cause the one or more processors to anchor the subscribing gNodeB network node to a first UP entity of the one or more UP entities based on the traffic engineering data. Specifically, the traffic engineering data comprises a list of UPs along an optimal path with congestion below a determined threshold and wherein the anchoring of the first UP entity is based on the list of UPs.

A non-transitory computer-readable storage medium having stored therein instructions which, when executed by a processor, causes the processor to receive an attach request message from a subscribing gNodeB network node. The instructions can cause the one or more processors to receive traffic engineering data associated with one or more User Plane (UP) entities for selecting a least congested network path. The instructions can also cause the one or more processors to anchor the subscribing gNodeB network node to a first UP entity of the one or more UP entities based on the traffic engineering data. Specifically, the traffic engineering data comprises a list of UPs along an optimal path with congestion below a determined threshold and wherein the anchoring the first UP entity is based on the list of UPs. The instructions can also cause the processor to subscribe to receive the traffic engineering data to receive updates regarding a first set of interfaces between a radio access network (RAN) and the one or more UP entities, a second set of interfaces between the one or more UP entities and a Data Network (DN) and/or a third set of interfaces between the one or more UP entities and one or more respective branching User Plane Functions (UPF).

With increased 5G UE cases of eMBB (enhanced mobile broadband), VR/AR, 4K/HD video, and other high bandwidth cases getting deployed, the backhaul network, specifically links associated with the User Plane Function (UPF), will likely succumb to congestion. Given the small cells of 5G for high bandwidth use cases, this may result in a complex distributed congestion problem in the network, which may pose threat to SLAs (service level agreements) around low latency as well as for high speed UEs. 3GPP (3rd Gen Partnership Project) has so far not considered the traffic engineering aspects as part of the 5G architecture.

There therefore exist needs for systems and methods for solving complex distributed congestion in a 5G, or LTE Control Plane and User Plane Separation (CUPS), network by using traffic engineering data to redirect sessions and for policy planning.

EXAMPLE ASPECTS

The disclosed technology addresses the need in the art for solving complex distributed congestion in an IP network, such as a 5G or LTE CUPS network, by using traffic engineering data to redirect sessions. Additionally, the disclosed technology addresses the need in the art for monitoring and collecting data associated with a traffic engineering state of the IP network, specifically a IP network backhaul, and using the data to correct and provide alternate, non-congested paths, and thus elevating the UE quality of experience. The present technology involves systems, methods, and computer-readable media anchoring a network node to a User Plane (UP) entity based on traffic engineering data. Additionally, the present technology involves systems, methods, and computer-readable media for subscribing to traffic engineering data associated with requested parameters to push particular policies and/or select alternate application functions to correct congestion.

Figure 1B:
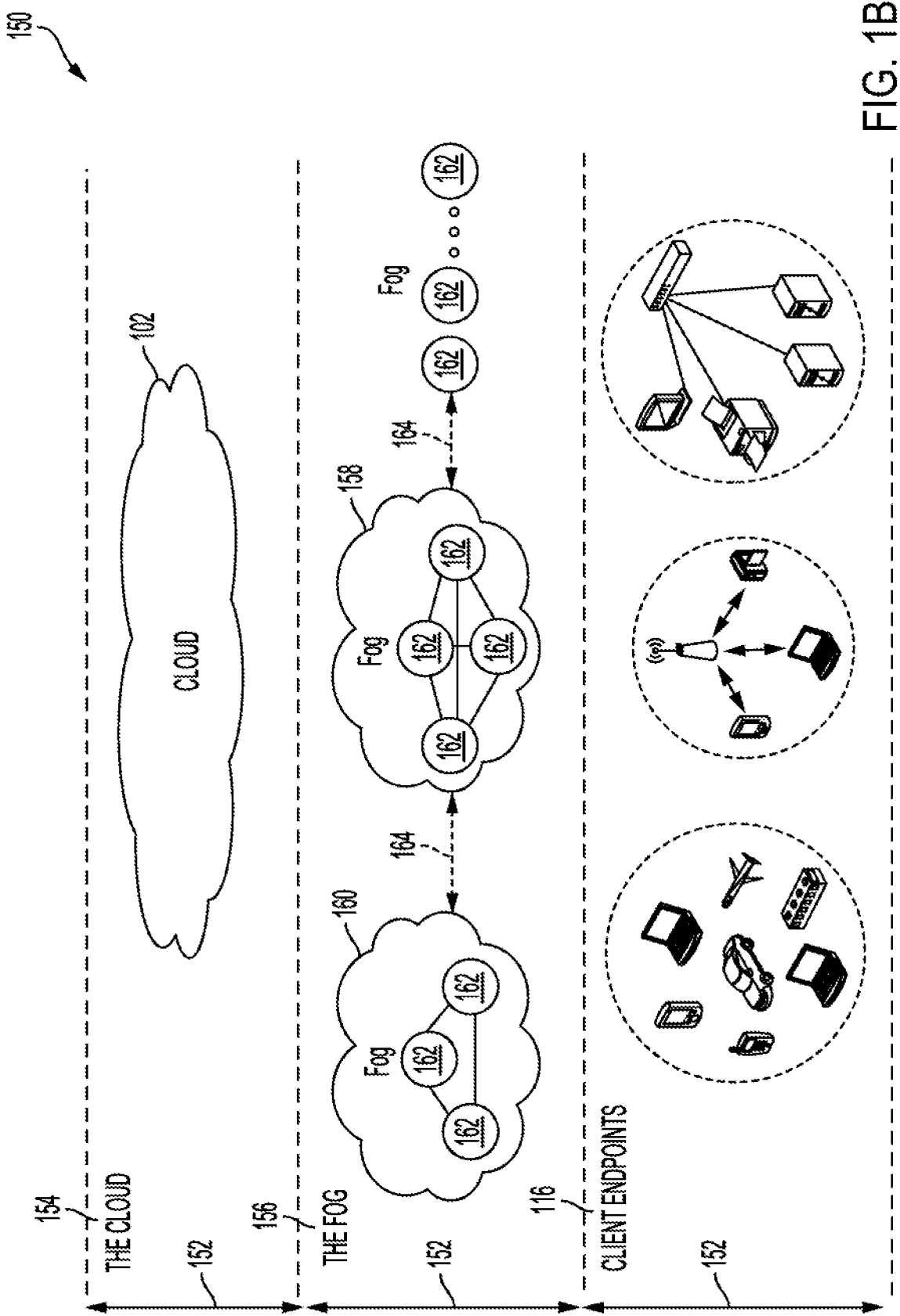
FIG. 1B illustrates an example fog computing architecture.
Figure 2:
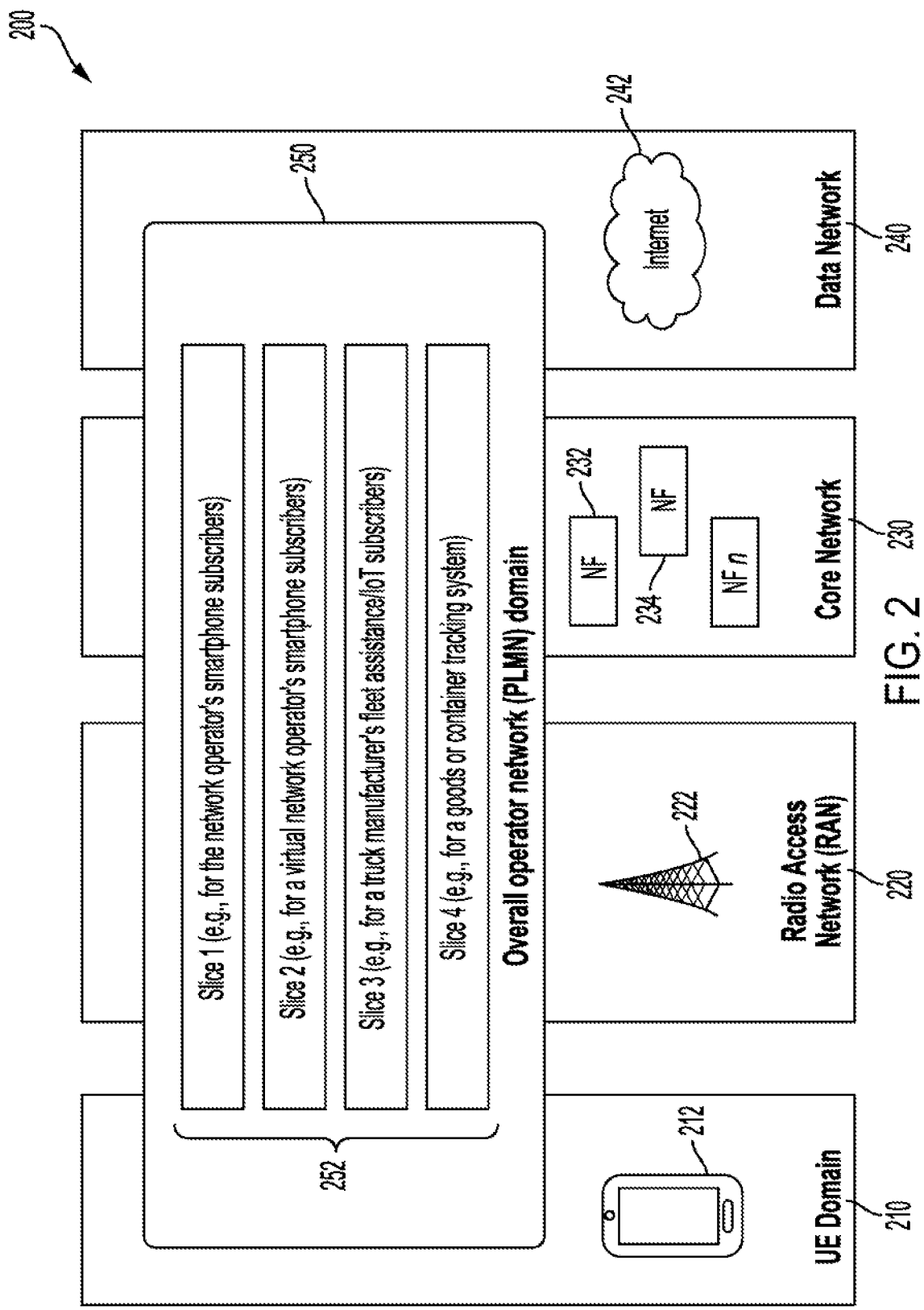
FIG. 2 depicts an exemplary schematic representation of a network environment in which network slicing has been implemented, and in which one or more aspects of the present disclosure may operate.

A description of network environments and architectures for network data access and services, as illustrated in FIGS. 1A, 1B, and 2 are first disclosed herein. A discussion of systems, methods, and computer-readable medium for federating enterprises and SaaS providers using network slices, as shown in FIGS. 3-8, will then follow. The discussion then concludes with a brief description of example devices, as illustrated in FIG. 9. These variations shall be described herein as the various aspects are set forth. The disclosure now turns to FIG. 1A.

FIG. 1A illustrates a diagram of an example cloud computing architecture 100. The architecture can include a cloud 102. The cloud 102 can be used to form part of a TCP connection or otherwise be accessed through the TCP connection. Specifically, the cloud 102 can include an initiator or a receiver of a TCP connection and be utilized by the initiator or the receiver to transmit and/or receive data through the TCP connection. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can be used to provide various cloud computing services via the cloud elements 104-114, such as SaaSs (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates a diagram of an example fog computing architecture 150. The fog computing architecture can be used to form part of a TCP connection or otherwise be accessed through the TCP connection. Specifically, the fog computing architecture can include an initiator or a receiver of a TCP connection and be utilized by the initiator or the receiver to transmit and/or receive data through the TCP connection. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network (s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

FIG. 2 depicts an exemplary schematic representation of a network environment 200 in which network slicing has been implemented, and in which one or more aspects of the present disclosure may operate. As illustrated, network environment 200 is divided into four domains, each of which will be explained in greater depth below; a User Equipment (UE) domain 210, e.g. of one or more enterprise, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, ..., n reside; and a Data Network 240, in which one or more data communication networks such as the Internet 242 reside. Additionally, the Data Network 240 can support SaaS providers configured to provide SaaSs to enterprises, e.g. to users in the UE domain 210.

Core Network 230 contains a plurality of Network Functions (NFs), shown here as NF 232, NF 234 ... NF n. In some aspects, core network 230 is a 5G core network (5GC) in accordance with one or more accepted 5GC architectures or designs. In some aspects, core network 230 is an Evolved Packet Core (EPC) network, which combines aspects of the 5GC with existing 4G networks. Regardless of the particular design of core network 230, the plurality of NFs typically execute in a control plane of core network 230, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some aspects, the plurality of NFs of core network 230 can include one or more Access and Mobility Management Functions (AMF; typically used when core network 230 is a 5GC network) and Mobility Management Entities (MME; typically used when core network 230 is an EPC network), collectively referred to herein as an AMF/MME for purposes of simplicity and clarity. In some aspects, an AMF/MME can be common to or otherwise shared by multiple slices of the plurality of network slices 252, and in some aspects an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the network environment 200, an overall operator network domain 250 is defined. The operator network domain 250 is in some aspects a Public Land Mobile Network (PLMN), and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the Radio Access Network (RAN) 120, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, providing new functionalities of core functions at the core network 230 and maintaining uncongested data rates at the 5G UE from a User Plane Function (UPF) are important for successfully deploying 5G SA (Stand-Alone) with network operators. When more network operators move to the 5G SA architecture, the backhaul network may succumb to congestion. This is especially the case given the small cells of 5G for high bandwidth cases, and that more and more 5G UE use cases of eMBB (enhanced mobile broadband), VR/AR, 4K/HD video, and other high bandwidth cases are getting deployed.

In addition, in LTE Control Plane and User Plane Separation (CUPS), similar issues of congestion may occur. For example, in both 5G and LTE CUPS deployment, communication between SMF (session management function)/CP (control plane) and UPF (user plane function) happens using N4/Sx protocol. However, in selecting a UPF/UP for a subscriber's session to be anchored to, the SMF does not consider the network KPIs of the path from gNB/eNB to UPF/UP and UPF/UP out to Internet. Packet core backhaul network between gNB/eNB and UPF is likely to get congested given the multiplication effect in backhaul traffic brought in by 5G data rates.

As such, it is desirable for traffic engineering data to be monitored and collected and provide a function for auto-correction of back-haul network congestion, specifically interfaces associated with the UPF, which are likely to get congested given the multiplication effect in backhaul traffic brought in by 5G data rates.

Figure 3:
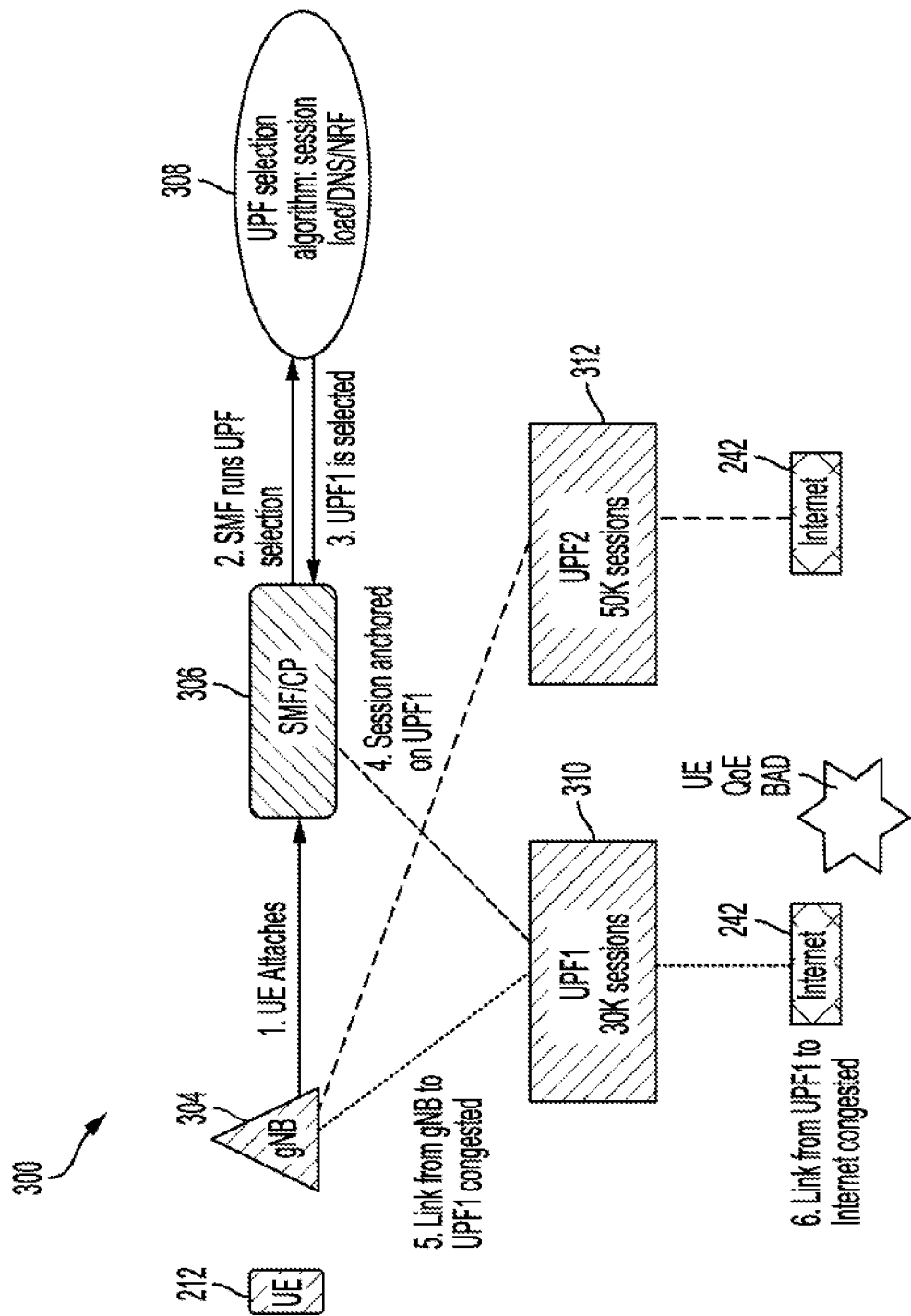
FIG. 3 depicts a schematic representation of an example network environment having a selected User Plane Function (UPF) link that is congested, according to some aspects of the present disclosure.

FIG. 3 depicts a schematic representation of an example network environment 300 having a selected User Plane Function (UPF) link that is congested. A subscriber, such as a UE 212, may request Session Management Function/Control Plane (SMF/CP), through a base station, such as a gNodeB (gNB) 304, to anchor to a User Plane Function (UPF) for a session. SMF/CP has an option to select a UPF in a UPF group, such as between UPF1 310 and UPF2 312, using a UPF selection algorithm that is based on a UPF selection algorithm 308 that may consider session load of each UPF, DNS queries, and other parameters.

However, in order to take into consideration congestion in a packet core backhaul network, such as between gNB/eNB and UPF, network KPIs can be monitored and can be provided to the SMF/CP 306 in the form of lists of UPFs that are along an optimal path with low congestion. The SMF/CP 306 can then anchor the session to one of the UPFs from the provided list. As shown in FIG. 3, SMF/CP 306 may learn about the congestion at UPF1 310 and then re-anchor the session on UPF2 312. The optimal path may change in real-time for a next subscriber session based on where the subscriber is located. As such, each subscriber will be anchored on a path where it can receive the best quality of experience.

Figure 4A:
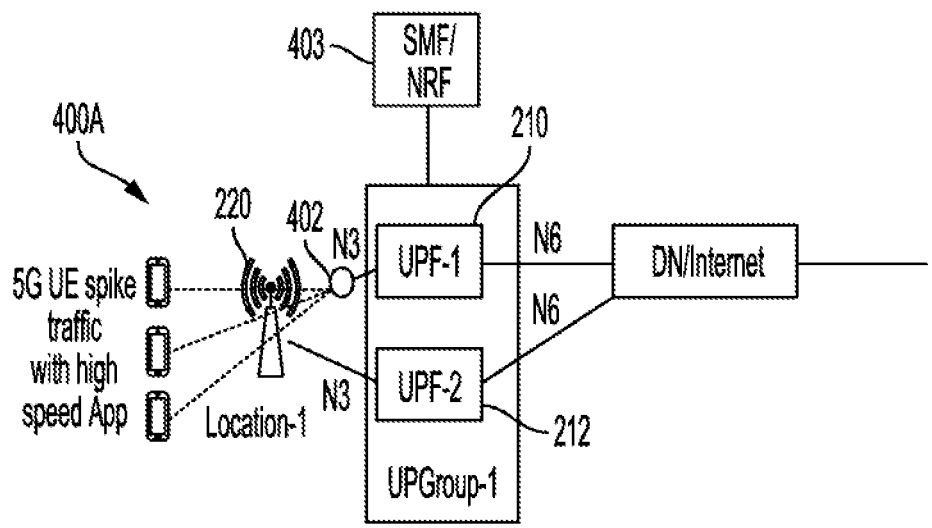
FIG. 4A depicts a schematic representation of an example network environment having a User Equipment (UE)-UPF (N3) link that is congested, according to some aspects of the present disclosure.
Figure 4B:
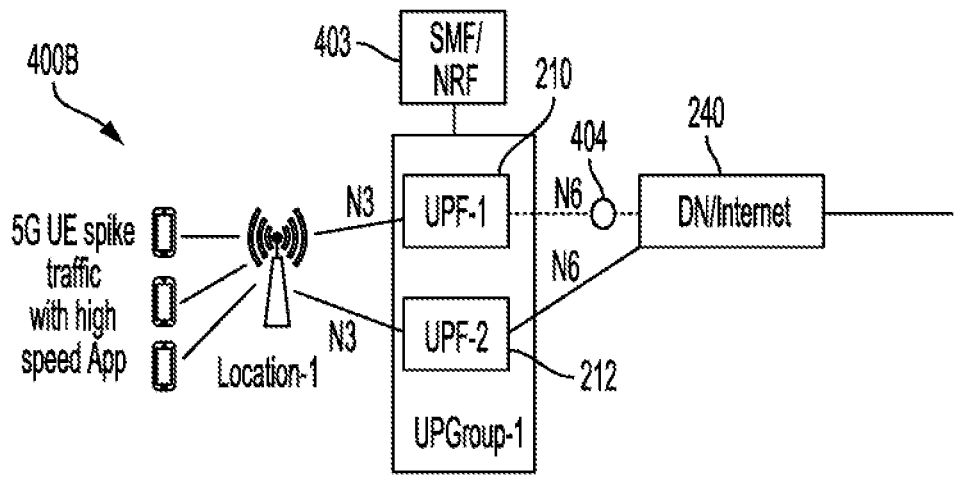
FIG. 4B depicts a schematic representation of an example network environment having a UPF-Internet (N6) link that is congested, according to some aspects of the present disclosure.
Figure 4C:
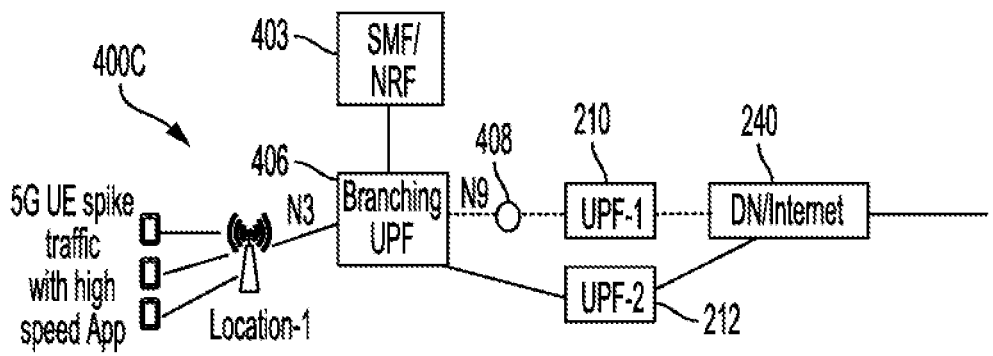
FIG. 4C depicts a schematic representation of an example network environment having a Branching UPF-UPF (N9) link that is congested, according to some aspects of the present disclosure.

FIG. 4A depicts a schematic representation of a first example network environment 400A having RAN-UPF link that is congested. The link between the RAN domain 220 and a UPF, such as the UPF1 310 as shown in FIG. 4A, may be referred to as an N3 link 402. FIG. 4B depicts a schematic representation of a second example network environment 400B having a UPF-Internet link that is congested. The link between a UPF, such as the UPF1 310 as shown in FIG. 4B, and the data network 240 may be referred to as an N6 link 404. FIG. 4C depicts a schematic representation of a third example network environment 400C having a Branching UPF-UPF link that is congested. The link between a UPF, such as the UPF1 310 as shown in FIG. 4C, and a branching UPF 406 may be referred to as an N9 link.

Selecting a UPF based on UE-location or 3GPP mechanism and load balance between UPFs in a UP group does not take into consideration congestion on any given UPF. Therefore, by receiving traffic engineering data, the SMF 306 or Network Repository Function 614 (see FIG. 4) (SMF/NRF 403) is able to take congestion into consideration as a factor for UPF selection.

Figure 5:
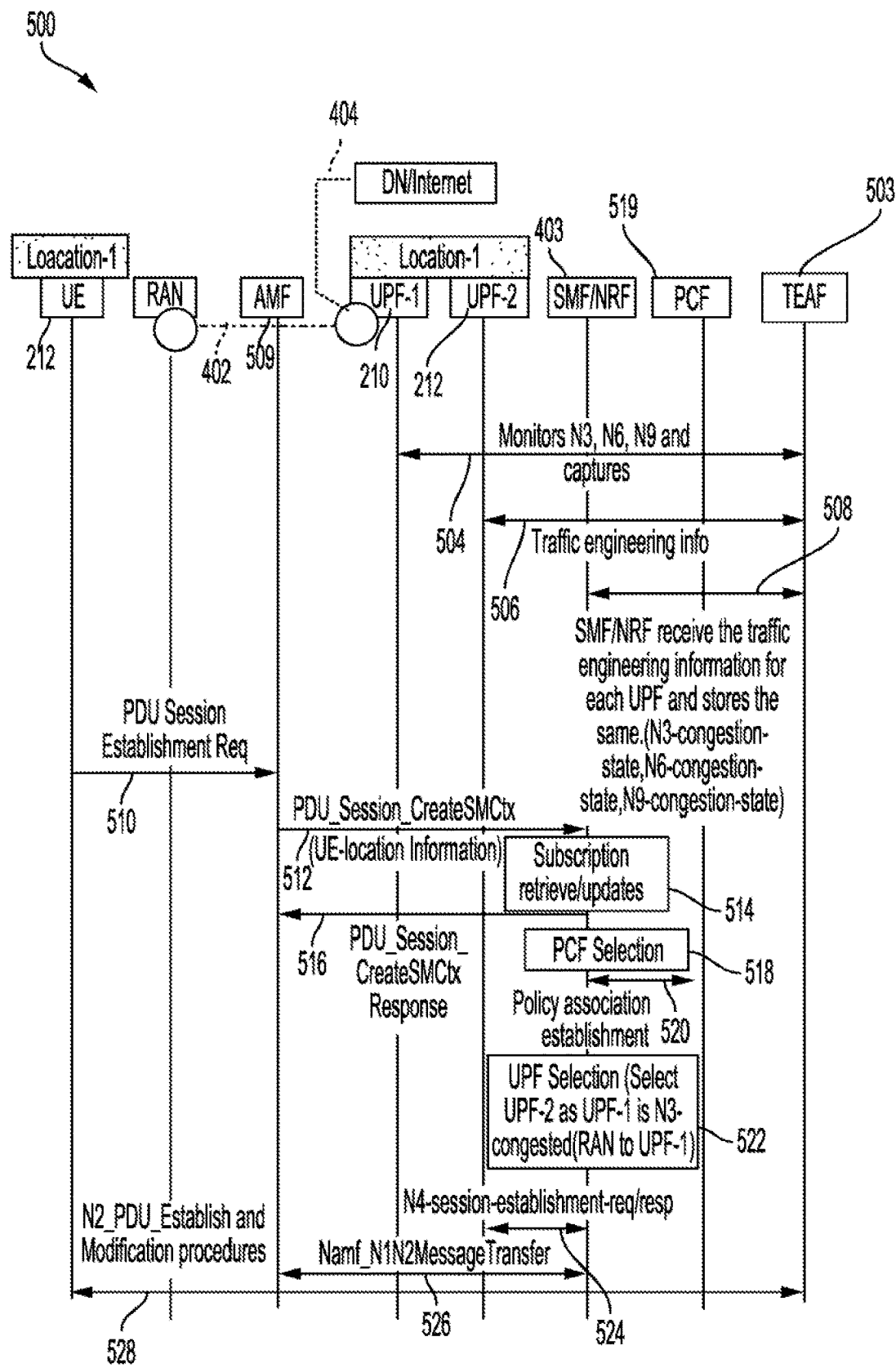
FIG. 5 illustrates an example flow diagram of a UE session establishment with a UPF based on traffic engineering information, according to some aspects of the present disclosure.

FIG. 5 illustrates an example flow diagram 500 of a UE session establishment with a UPF based on traffic engineering information. When there is congestion, such as N3 link congestion 501 or N6 link congestion 502, associated with a UPF, such as either with UPF1 310 or UPF2 312, such traffic engineering data is monitored 504, 506 by a Traffic Engineering Awareness Function (TEAF) 503. The SMF/NRF 403, may receive and/or store (508) the traffic engineering information for each UPF. For example, the traffic engineering data may include network KPIs, congestion states for each link, and/or a list of UPFs that are along an optimal path with low congestion.

The UE 212 may send a request (510) to the AMF 509 for Protocol Data Unit (PDU) session establishment. The AMF 509 may receive the request and forward (512) a request to create a session, along with UE location information, to the SMF/NRF 403. The SMF/NRF 403 may retrieve (514) subscription updates and send a response (516) back to AMF 509. The SMF/NRF 403 may select (518) a Policy Control Function (PCF) 519 and based on the selection, establish (520) a policy association with the PCF 519. The PCF 519 is a control plane network function (NF) that may provide policy rules for control plane functions and may further provide real-time management of subscribers, applications, and network resources. The SMF/NRF 403 may select (522) a UPF, for example, the SMF/NRF 403 select UPF2 312 because UPF1 310 is congested. The SMF/NRF 403 may establish (524) a N4 link with UPF2 312 and relay (526) information to AMF 509 which then sends (528) establish and modification procedures to the UE 212.

Figure 6A:
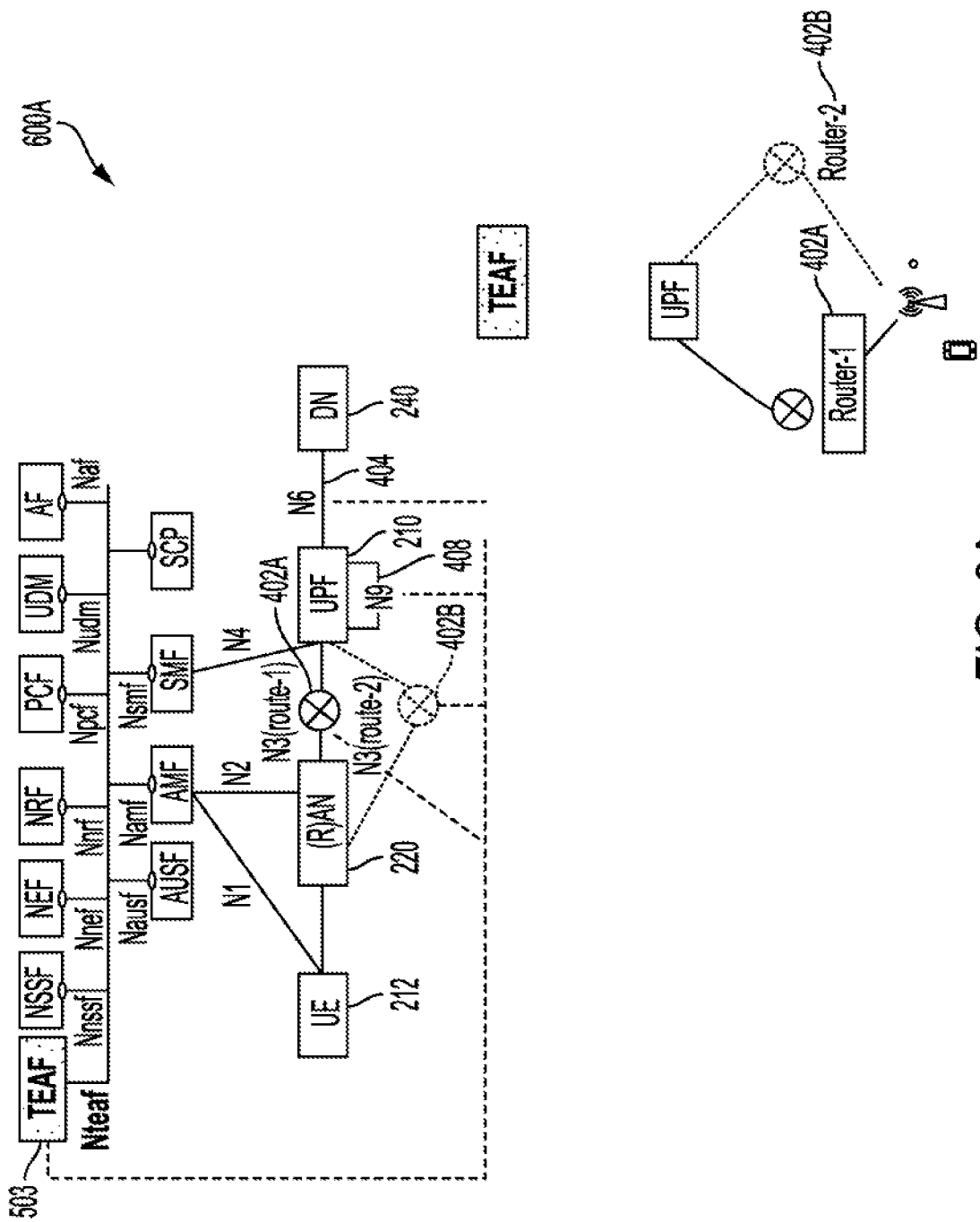
FIG. 6A illustrates a schematic representation of an example network environment having a Traffic Engineering Awareness Function (TEAF) that monitors and collects traffic information at the N3, N6, and N9 links, according to some aspects of the present disclosure.

FIG. 6A illustrates a schematic representation of an example network environment 600A having a TEAF 403 that monitors and collects traffic engineering information at the N3, N6, and N9 links. The N3 link 402 may comprise different routes and associated routers, such as Router 1 402A (on N3 route-1) and Router 2 402B (on N3 route-2). The TEAF 403 may monitor and collect traffic engineering data from the Router 1 402A and Router 2 402B and detect that Router 2 402B has succumbed to congestion. TEAF 403 may further program the network to re-route the traffic via Router 1 402A to ease congestion at Router 2 402B.

Figure 6B:
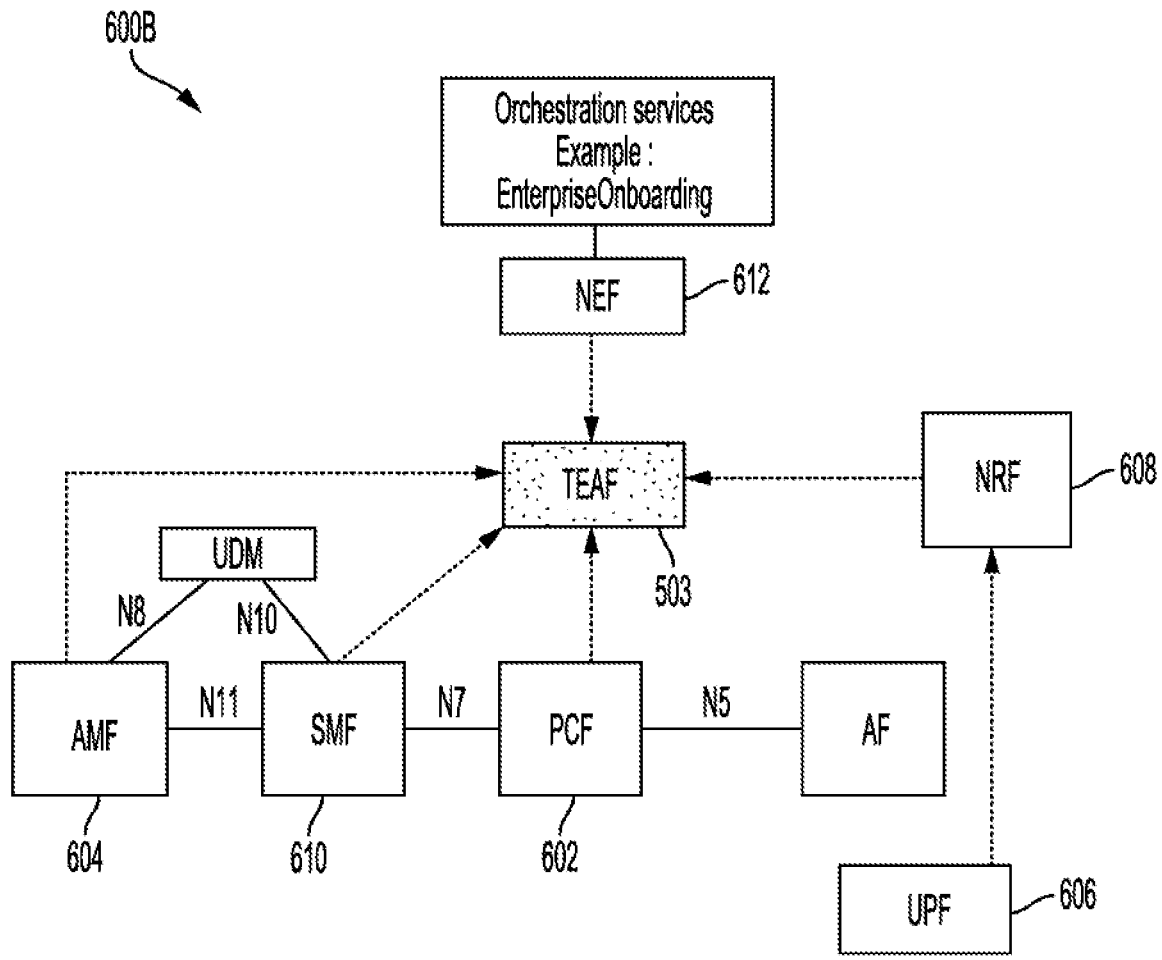
FIG. 6B illustrates a schematic representation of an example network environment having various Application Functions (AFs) subscribing for Traffic Engineering Awareness Data (TEAD), according to some aspects of the present disclosure.

TEAF 403 may monitor and collect traffic engineering information pertaining to links including the N3, N6, and N9 links, while other Network Functions (NF) may subscribe to particular Traffic Engineering Awareness Data (TEAD) associated with the links. FIG. 6B illustrates a schematic representation of an example network environment 600B having various NFs subscribe for traffic engineering data from TEAF 503. For example, a Policy Control Function (PCF) 602 may use traffic engineering data to known to impact certain subscribers or UPF nodes, via its Service Based Interface (SBI). The SBI interface serves as an interface that allows for two programs to communicate. The PCF 602 may push policy in terms of lowering APNMBR bit rate of a subscriber to ease congestion. The PCF 602 may also request the TEAF 503 to auto-correct the network for certain APN locations to relieve congestion at the N3 link 402, the N6 link 404, or the N9 link 408 (see FIG. 6A).

Access and Mobility Management Function (AMF) 604 may subscribe to traffic engineering data at certain locations from TEAF 503 and may select an alternate Session Management Function (SMF) 610 based on a traffic engineering state of the network.

The UPF 606 may interface with TEAF 503 or Network Repository Function (NRF) 608 over its SBI interface to receive its traffic engineering data and may perform self-overload control, such as by rejecting new sessions or dropping lower priority sessions. The NRF 608 may use traffic engineering data from all UPFs 606 and sort the UPFs based on load/overload in the network. The NRF 608 may interface with TEAF 503 to receive traffic engineering data for the UPFs, which can be used to help the SMF 610 in UPF selection.

The SMF 610 may use traffic engineering data based on Access Point Name (APN) and location. The APN may identify the part of the network where a user session is established. The SMF 610 may receive traffic engineering data regarding the UPF 606 and use such data for selecting an alternative group of UPs when the NRF 608 is not in use. The SMF 610 can also program traffic shaping algorithms, such as Cisco Ultra Traffic Optimization (CUTO) or Control Plane and User Plane Separation (CUPS), on the UPF 606 based on traffic engineering data so that the UPF 606 shapes traffic at lower rates and hence lowering congestion.

Network Exposure Function (NEF) 612 may orchestrate network slicing based on the traffic engineering data. Orchestration services such as enterprise onboarding, may use the traffic engineering data in algorithms for determining which routers have reachability to which enterprise and hence choose the appropriate router for onboarding the new enterprise, such as by configuring virtual routing and forwarding for the enterprise on these routers. As such, the NEF 612 and associated orchestration system may bring up more virtual routers and paths in the network for additional capacity.

Figure 7:
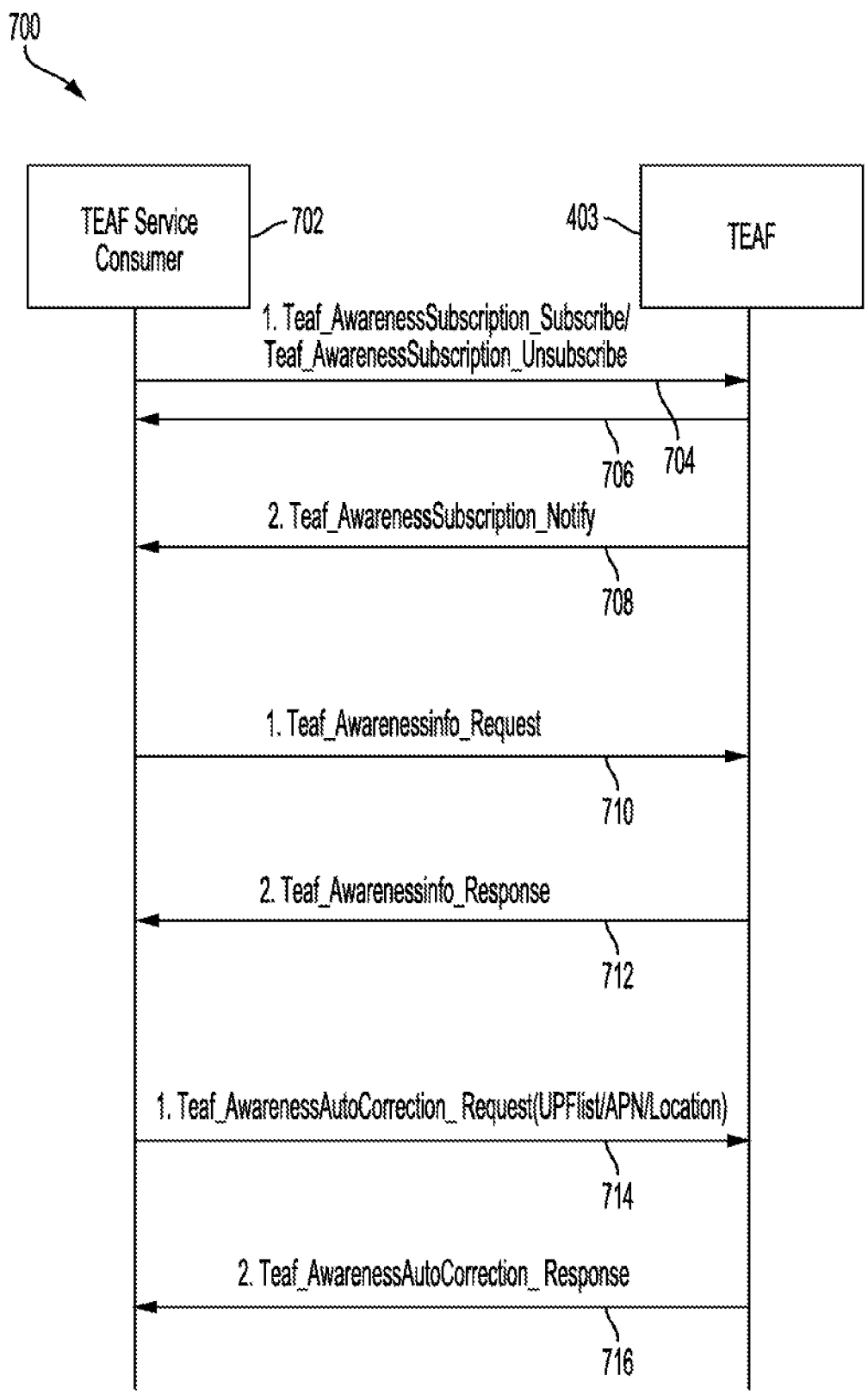
FIG. 7 illustrates an example flow diagram of a TEAF Service Consumer subscribing for traffic engineering data, requesting an auto correction, and requesting specific traffic engineering data, according to some aspects of the present disclosure.

FIG. 7 illustrates an example flow diagram 700 of a TEAF Service Consumer 702 subscribing for traffic engineering data, requesting an auto-correction, and requesting specific traffic engineering data. The TEAF Service Consumer 702 may be any AF that can receive traffic engineering data and interface with the TEAF 403. For example, the TEAF Service Consumer 702 may subscribe (704) or unsubscribe (with receipt 706) for traffic engineering data that the TEAF 403 will notify (708) back to the consumers when applicable. The SBI interface procedures for the TEAF 403 may allow the TEAF Service Consumer 702 to request (710) for traffic engineering data that the TEAF 403 will respond (712) to the consumers based on the parameters set in the subscription. The SBI interface may also provide functionality for 5G System's Network Functions (NFs) to program and request (714) the TEAF 403 to perform (716) auto-correction on the network. The above procedures may be invoked via the NEF 612. In other words, the TEAF 403 may extend its services to the other NFs in 5G via SBI interfaces that were defined to subscribe to traffic engineering data for certain locations or certain APN or UPF-list or combinations of the same. Locations may be TAC/PRA/RAC/eNB etc.

Figure 8:
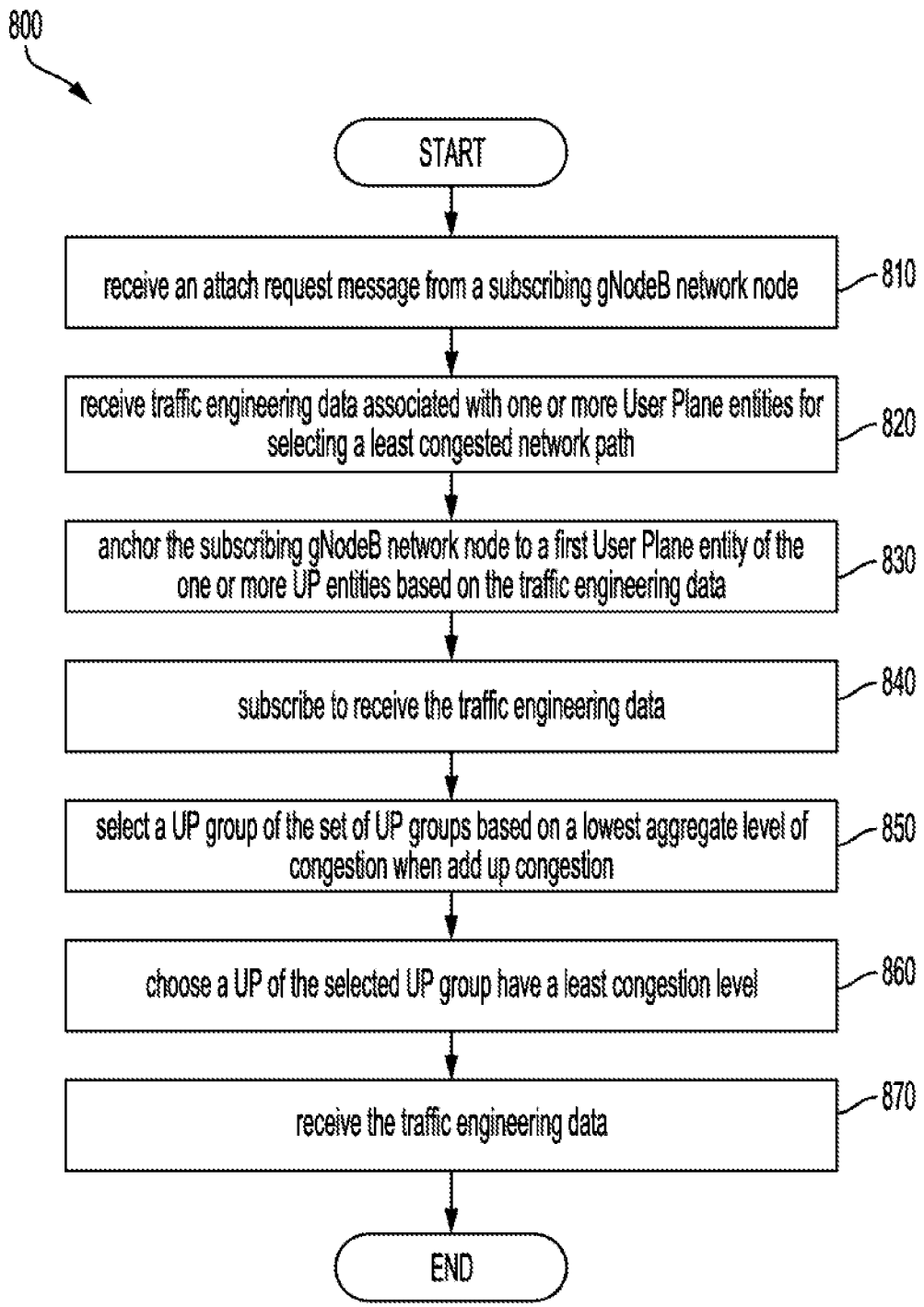
FIG. 8 illustrates an example method for anchoring a network node to a User Plane (UP) entity based on traffic engineering data, according to some aspects of the present disclosure.
Figure 9:
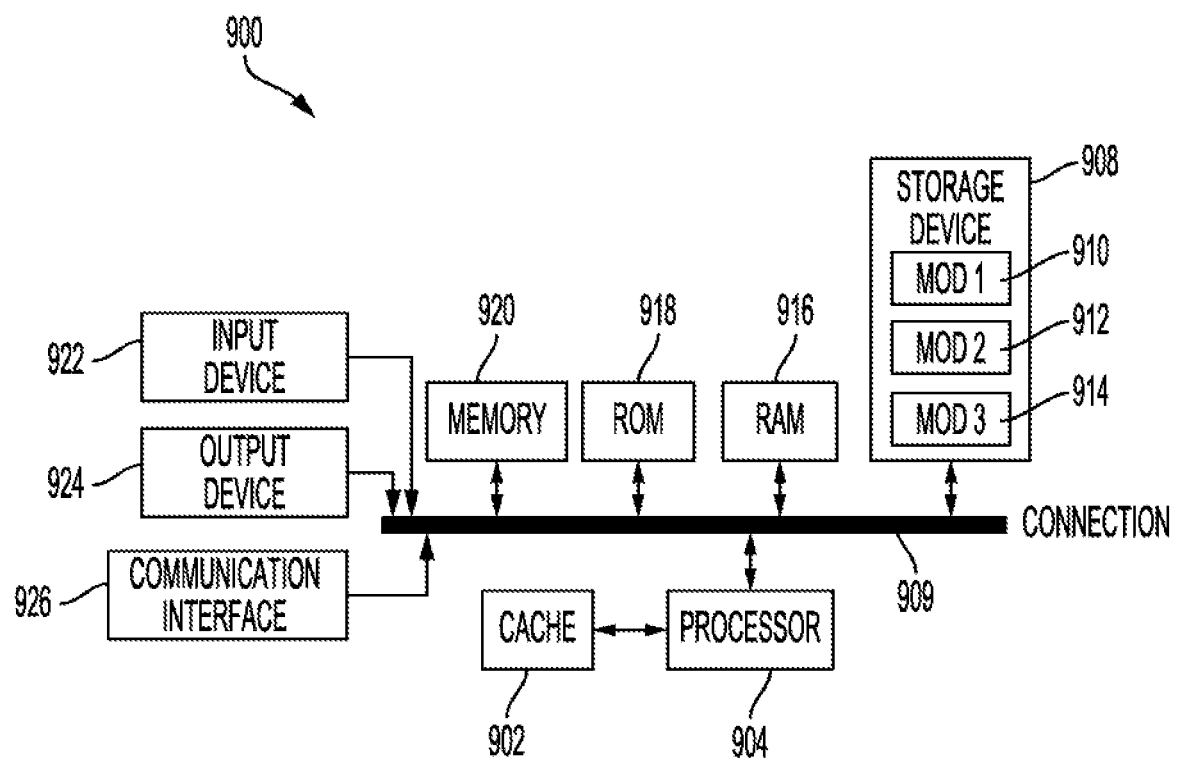
FIG. 9 illustrates a computing system architecture including various components in electrical communication with each other using a connection, such as a bus, according to some aspects of the present disclosure.

FIG. 8 illustrates an example method for anchoring a subscribing network node to a User Plane (UP) entity based on traffic engineering data. Although the example method 800 depicts a particular sequence of operations, the sequence may be altered without departing from the scope of the present disclosure. For example, some of the operations depicted may be performed in parallel or in a different sequence that does not materially affect the function of the method 800. In other examples, different components of an example device or system that implements the method 800 may perform functions at substantially the same time or in a specific sequence.

According to some aspects, the method includes receiving an attach request message from a subscribing gNodeB network node at step 810. For example, the Session Management Function (SMF) or a Control Plane (CP) (SMF/CP 306) of a 5G-compatible IP network illustrated in FIG. 3 may receive an attach request message from a subscribing gNodeB network node.

According to some aspects, the method includes receiving traffic engineering data associated with one or more User Plane entities for selecting a least congested network path at step 820. For example, the SMF/CP 306 of a 5G-compatible IP network illustrated in FIG. 3 can receive traffic engineering data associated with one or more User Plane entities to select a least congested network path. In some aspects, the traffic engineering data comprises a list of UPs along an optimal path with congestion below a determined threshold. In some aspects, the traffic engineering data comprises a congestion state in integer form for each of the one or more interfaces. For example, the congestion state may contain the following information:

N3-congestion-state—0—indicates N3 between RAN and UPF is not congested.

N3-congestion-level—x %—indicates congestion level as an integer between 1-100 with 1 being lowest.

N6-congestion-state—0—indicates N6 between UPF and DN/Internet is not congested.

N6-congestion-level—x %—indicates congestion level as an integer between 1-100 with 1 being lowest.

N9-congestion-state—0—indicates N9 between BranchingUPF and UPF is not congested.

N9-congestion-level—x %—indicates congestion level as an integer between 1-100 with 1 being lowest.

According to some aspects, the method includes anchoring the subscribing gNodeB network node to a first User Plane entity of the one or more UP entities based on the traffic engineering data at step 830. For example, the SMF/CP 306 of a 5G-compatible IP network illustrated in FIG. 3 may anchor the subscribing gNodeB to a first User Plane entity of the one or more UP entities based on the traffic engineering data. In some aspects, anchoring the first UP entity is based on the list of UPs.

According to some aspects, the method includes receiving, from a network element, a subscription request for traffic engineering data, wherein the subscription request comprises parameters for responding and re-routing receive the traffic engineering data at step 840. For example, the TEAF 503, illustrated in FIGS. 5 and 6A-6B may receive, from a network element, a subscription request for traffic engineering data, wherein the subscription request comprises parameters for responding and re-routing the traffic engineering data. The TEAF Service Consumer 702 may receive updates regarding at least one of a first set of interfaces between a radio access network and the one or more UP entities, a second set of interfaces between the one or more UP entities and a Data Network, and/or a third set of interfaces between the one or more UP entities and one or more respective branching User Plane Functions. According to some aspects, the network element is the SMF/CP 306 of a 5G-compatible IP network illustrated in FIG. 3

According to some aspects, the method includes monitoring and collecting traffic engineering data of a plurality of interfaces of the 5G-compatible IP network at step 850. For example, the TEAF illustrated in FIG. 4A-4C may monitor and collect traffic engineering data of a plurality of interfaces of the 5G-compatible IP network.

According to some aspects, the method includes sending, to the network element, a response comprising some of the collected traffic engineering data associated with the requested parameters at step 860. For example, the TEAF illustrated in FIG. 4A-4C may send, to the network element, a response comprising some of the collected traffic engineering data associated with the requested parameters.

According to some aspects, the method includes re-routing traffic in the 5G compatible IP network based on the parameters via Software-Defined Networking (SDN) at step 870. For example, the TEAF 503 illustrated in FIG. 4A-4C may re-route traffic in the 5G compatible IP network based on the parameters set via Software-Defined Networking (SDN).

According to some aspects, the method includes selecting a set of UP groups based on an Access Point Name (APN) and a location of a respective User Equipment (UE). For example, the SMF/NRF 403 illustrated in FIG. 4A-4C may select a set of UP groups based on an Access Point Name (APN) and a location of a respective User Equipment (UE).

According to some aspects, the method includes selecting a UP group of the set of UP groups based on a lowest aggregate level of congestion when adding up congestion of all the UPs in each group. For example, the SMF/NRF 403 illustrated in FIG. 4A-4C may select a UP group of the set of UP groups based on a lowest aggregate level of congestion when adding up congestion of all the UPs in each group. The congestion may be determined from the subscribed traffic engineering data received from the TEAF 503.

According to some aspects, the method includes choosing a UP of the selected UP group having a least congestion level for a respective interface between the UP and a Radio Access Network and a respective interface between the UP and a Data Network. For example, the SMF/NRF 403 illustrated in FIG. 4A-4C may choose a UP of the selected UP group having a least congestion level for a respective interface between the UP and a Radio Access Network and a respective interface between the UP and a Data Network.

According to some aspects, the method includes receiving the traffic engineering data from the Traffic Engineering Awareness Function (TEAF) 403. For example, the PCF 602, the AMF 604, the UPF 606, the SMF 610, and/or the NEF 612 illustrated in FIG. 6B may receive the traffic engineering data from the TEAF 403. In some aspects, the TEAF monitors and collects traffic engineering data of a plurality of interfaces of the 5G-compatible IP network. In some aspects, the TEAF 403 comprises an SBI through which network elements are provided a means to subscribe to TEAF data and/or request performance of auto-correction on the 5G-compatible IP network. In some aspects, the PCF 602 uses the collected traffic engineering data to push particular policies for lowering APN-MBR bit rate of subscribers to ease congestion and/or requests the TEAF 403 to auto-correct the 5G-compatible IP network for certain Access Point Name locations to ease congestion. In some aspects, the AMF 604 uses the collected traffic engineering data to select an alternate SMF.

In some aspects, the UPF 606 uses the collected traffic engineering data to perform self-overload control including at least one of rejection new sessions, dropping lower priority sessions, and regulating traffic. In some aspects, the NRF 608 uses the collected traffic engineering data to select an alternate UPF. In some aspects, the SMF 610 uses the collected traffic engineering data to select an alternate UP group and/or program a traffic shaping algorithm on a UPF, providing the UPF with a traffic controlling capability. In some aspects, an orchestration system uses the collected traffic engineering data to bring up one or more virtual routers and paths in the 5G-compatible IP network based on a determined need and/or use an algorithm to determine reachability between routers and a new enterprises for onboarding the new enterprise.

FIG. 9 illustrates a computing system architecture 900 including various components in electrical communication with each other using a connection 906, such as a bus. Example system architecture 900 includes a processing unit (CPU or processor) 904 and a system connection 906 that couples various system components including the system memory 920, such as read only memory (ROM) 918 and random access memory (RAM) 916, to the processor 904. The system architecture 900 can include a cache 902 of high-speed memory connected directly with, in close proximity to, or integrated as part of the processor 904. The system architecture 900 can copy data from the memory 920 and/or the storage device 908 to the cache 902 for quick access by the processor 904. In this way, the cache can provide a performance boost that avoids processor 904 delays while waiting for data. These and other modules can control or be configured to control the processor 904 to perform various actions.

Other system memory 920 may be available for use as well. The memory 920 can include multiple different types of memory with different performance characteristics. The processor 904 can include any general purpose processor and a hardware or software service, such as service 1 910, service 2 912, and service 3 914 stored in storage device 908, configured to control the processor 904 as well as a special-purpose processor where software instructions are incorporated into the actual processor design. The processor 904 may be a completely self-contained computing system, containing multiple cores or processors, a bus, memory controller, cache, etc. A multi-core processor may be symmetric or asymmetric.

To enable user interaction with the computing system architecture 900, an input device 922 can represent any number of input mechanisms, such as a microphone for speech, a touch-sensitive screen for gesture or graphical input, keyboard, mouse, motion input, speech and so forth. An output device 924 can also be one or more of a number of output mechanisms known to those of skill in the art. In some instances, multimodal systems can enable a user to provide multiple types of input to communicate with the computing system architecture 900. The communications interface 926 can generally govern and manage the user input and system output. There is no restriction on operating on any particular hardware arrangement and therefore the basic features here may easily be substituted for improved hardware or firmware arrangements as they are developed.

Storage device 908 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 916, read only memory (ROM) 918, and hybrids thereof.

The storage device 908 can include services 910, 912, 914 for controlling the processor 904. Other hardware or software modules are contemplated. The storage device 908 can be connected to the system connection 906. In one aspect, a hardware module that performs a particular function can include the software component stored in a computer-readable medium in connection with the necessary hardware components, such as the processor 904, connection 906, output device 924, and so forth, to carry out the function.

For clarity of explanation, in some instances the present technology may be presented as including individual functional blocks including functional blocks comprising devices, device components, steps or routines in a method embodied in software, or combinations of hardware and software.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   receiving an attach request message from a subscribing gNodeB network node;
   receiving traffic engineering data associated with one or more User Plane (UP) entities for selecting a least congested network path;
   anchoring the subscribing gNodeB network node to a first UP entity of the one or more UP entities based on the traffic engineering data;
   selecting a UP group of a set of UP groups based on a lowest aggregate level of congestion when adding up congestion of UPs in each group; and
   choosing a UP of the selected UP group having a least congestion level.

2. The method of claim 1, wherein the traffic engineering data comprises a list of UPs along an optimal path with congestion below a determined threshold, and wherein the anchoring the first UP entity is based on the list of UPs.

3. The method of claim 1, further comprising:
   subscribing to receive the traffic engineering data to receive updates regarding at least one of:
   a first set of interfaces between a radio access network (RAN) and the one or more UP entities;
   a second set of interfaces between the one or more UP entities and a Data Network (DN); and
   a third set of interfaces between the one or more UP entities and one or more respective branching User Plane Functions (UPF).

4. The method of claim 1, wherein the traffic engineering data comprises a congestion state in integer form for each of one or more interfaces.

5. The method of claim 1, wherein the choosing the UP of the selected UP group having the least congestion level comprises choosing the UP of the selected UP group having the least congestion level for a respective interface between the UP and a Radio Access Network (RAN) and a respective interface between the UP and a Data Network (DN).

6. The method of claim 1 further comprising:
   receiving the traffic engineering data from a Traffic Engineering Awareness Function (TEAF), wherein the TEAF monitors and collects traffic engineering data of a plurality of interfaces of a 5G-compatible IP network.

7. The method of claim 6, wherein the TEAF comprises an SBI (Service Based Interface) through which network elements are provided to subscribe to TEAF data and/or request performance of auto-correction on the 5G-compatible IP network.

8. A non-transitory computer-readable storage medium storing instructions that, when executed by one or more processors, cause the one or more processors to:
   receive an attach request message from a subscribing gNodeB network node;
   receive traffic engineering data associated with one or more User Plane (UP) entities for selecting a least congested network path;
   anchor the subscribing gNodeB network node to a first UP entity of the one or more UP entities based on the traffic engineering data;
   select a UP group of a set of UP groups based on a lowest aggregate level of congestion when adding up congestion of UPs in each group; and
   choose a UP of the selected UP group having a least congestion level.

9. The non-transitory computer-readable storage medium of claim 8, wherein the traffic engineering data comprises a list of UPs along an optimal path with congestion below a determined threshold, and wherein the anchoring the first UP entity is based on the list of UPs.

10. The non-transitory computer-readable storage medium of claim 8, further comprising instructions to:
    subscribe to receive the traffic engineering data to receive updates regarding at least one of:
    a first set of interfaces between a radio access network (RAN) and the one or more UP entities;
    a second set of interfaces between the one or more UP entities and a Data Network (DN); and
    a third set of interfaces between the one or more UP entities and one or more respective branching User Plane Functions (UPF).

11. The non-transitory computer-readable storage medium of claim 8, wherein the traffic engineering data comprises a congestion state in integer form for each of one or more interfaces.

12. The non-transitory computer-readable storage medium of claim 8, wherein the choosing the UP of the selected UP group having the least congestion level comprises choosing the UP of the selected UP group having the least congestion level for a respective interface between the UP and a Radio Access Network (RAN) and a respective interface between the UP and a Data Network (DN).

13. The non-transitory computer-readable storage medium of claim 8, further comprising instructions to:
receiving the traffic engineering data from a Traffic Engineering Awareness Function (TEAF), wherein the TEAF monitors and collects traffic engineering data of a plurality of interfaces of a 5G-compatible IP network.

14. The non-transitory computer-readable storage medium of claim 13, wherein the TEAF comprises an SBI (Service Based Interface) through which network elements are provided to subscribe to TEAF data and/or request performance of auto-correction on the 5G-compatible IP network.

15. A system within a 5G-compatible IP network, the system comprising:
a Sessions Management Function (SMF) of a 5G-compatible IP network;
at least one non-transitory computer readable media storing instructions; and
at least one processor programmed to cooperate with the instructions to cause the system to perform operations at a Sessions Management Function (SMF) of the 5G-compatible IP network, the operations comprising:
receive an attach request message from a subscribing gNodeB network node;
receive traffic engineering data associated with one or more User Plane (UP) entities for selecting a least congested network path; and
anchor the subscribing gNodeB network node to a first UP entity of the one or more UP entities based on the traffic engineering data;
select a UP group of a set of UP groups based on a lowest aggregate level of congestion when adding up congestion of UPs in each group; and
choose a UP of the selected UP group having a least congestion level.

16. The system of claim 15, wherein the traffic engineering data comprises a list of UPs along an optimal path with congestion below a determined threshold, and wherein the anchoring the first UP entity is based on the list of UPs.

17. The system of claim 16, wherein the TEAF node comprises an SBI (Service Based Interface) through which a plurality of network elements are provided to subscribe to traffic engineering data and/or request performance of auto-correction on the IP network, and wherein the network element is the SMF.

18. The system of claim 15, the operations further comprising:
subscribing to receive the traffic engineering data to receive updates regarding at least one of:
a first set of interfaces between a radio access network (RAN) and the one or more UP entities;
a second set of interfaces between the one or more UP entities and a Data Network (DN); and
a third set of interfaces between the one or more UP entities and one or more respective branching User Plane Functions (UPF).

19. The system of claim 15, wherein the traffic engineering data comprises a congestion state in integer form for each of one or more interfaces.

20. The system of claim 15, wherein the choosing the UP of the selected UP group having the least congestion level comprises choosing the UP of the selected UP group having the least congestion level for a respective interface between the UP and a Radio Access Network (RAN) and a respective interface between the UP and a Data Network (DN).

\* \* \* \* \*